May 26, 1936. H. L. BLOOD 2,041,898
SIZE CONTROLLING MECHANISM FOR BORING MACHINES AND THE LIKE
Filed March 10, 1932 2 Sheets-Sheet 1
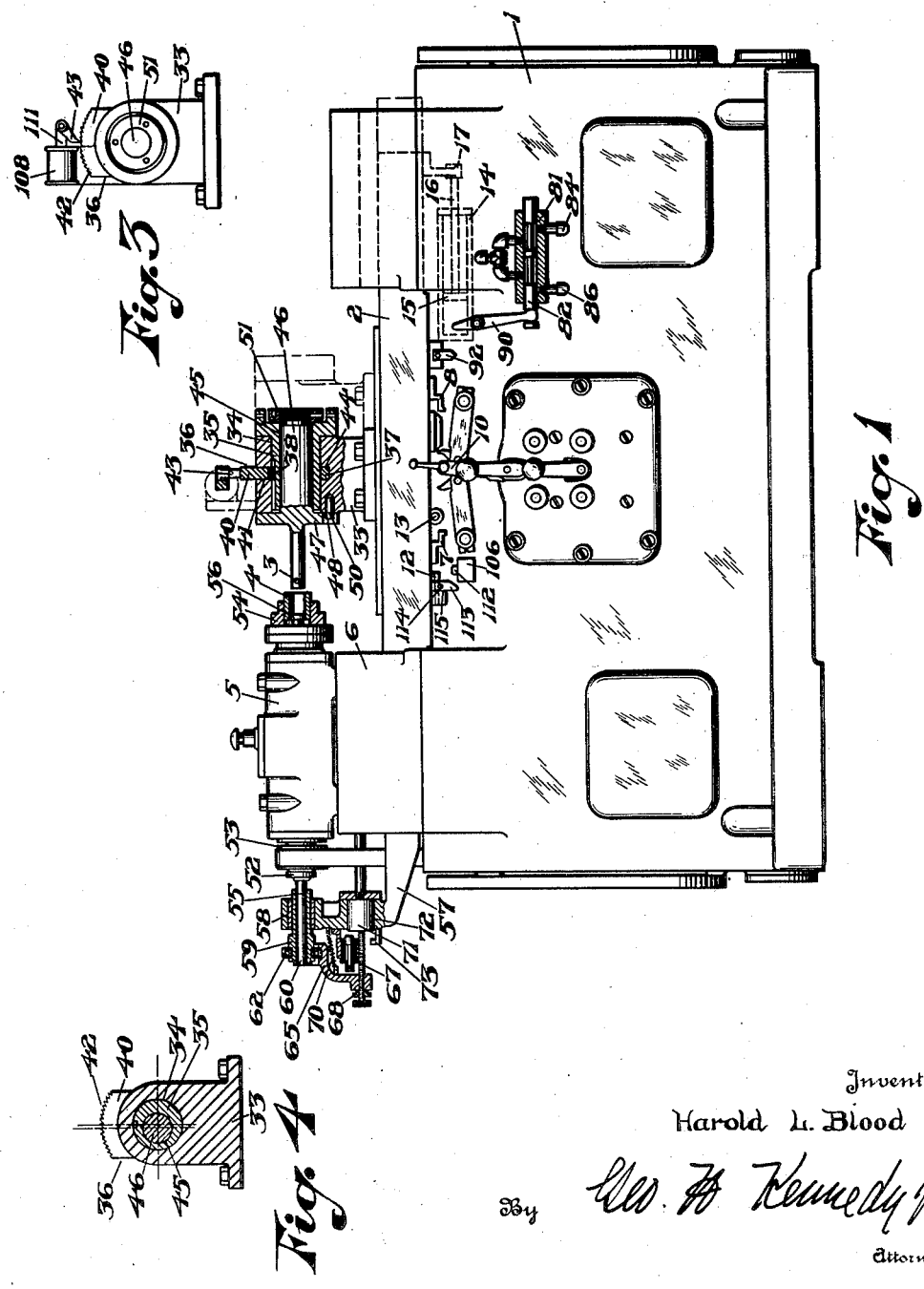
Inventor
Harold L. Blood
By Geo. H. Kennedy Jr.
Attorney May 26, 1936.     H. L. BLOOD     2,041,898

SIZE CONTROLLING MECHANISM FOR BORING MACHINES AND THE LIKE

Filed March 10, 1932     2 Sheets-Sheet 2

Inventor
Harold L. Blood
By Geo. H. Kennedy Jr.
Attorney

Patented May 26, 1936

2,041,898

UNITED STATES PATENT OFFICE 2,041,898

SIZE CONTROLLING MECHANISM FOR BORING MACHINES AND THE LIKE

Harold L. Blood, Worcester, Mass., assignor to The Heald Machine Company, Worcester, Mass., a corporation of Massachusetts Application March 10, 1932, Serial No. 598,035

REISSUED

23 Claims. (Cl. 77—3)

The present invention relates to machines by which a plurality of workpieces are successively reduced to a predetermined finished dimension and is particularly applicable to boring machines and the like in which the cutting tool is arranged to operate on a plurality of workpieces before the cutting surface thereof is resharpened.

In machines of this character, one form of which is disclosed in the copending application of Schmidt, Serial No. 552,625, filed July 23, 1931, the position of the cutting tool relative to the axis of the workholder is established and maintained during successive cutting operations on a large number of workpieces. The cutting tool which is formed of extremely hard material such as a diamond or tungsten carbide will operate on each successive workpiece without appreciable wear and without loss of the cutting ability of the tool. However, the cutting surface of the tool is gradually worn away by a large number of successive cutting operations and since the size of the finished workpiece is determined by the spacing of the cutting surface of the tool from the axis of the workpiece, the wear on the cutting surface eventually results in finished workpieces whose dimension after the cutting operation varies from the predetermined finished dimension in accordance with the amount of wear on said tool.

In order that each successive workpiece be finished to the proper dimension, it has been necessary to check the dimension of each workpiece after the cutting operation by a manual gaging operation. When the workpieces are no longer finished to the proper dimension, as indicated by the manual gaging, the cutting tool is adjusted manually relative to the workholding member to reestablish the cutting surface of the tool in proper position for reducing the workpieces to the desired dimension. The time required for the necessary gaging operation on each workpiece, as well as for the manual adjustment of the cutting surface, materially reduces the output of the machine. It is accordingly the principal object of the present invention to caliper or gage each successive workpiece before it is removed from the machine and to automatically adjust the position of the cutting tool relative to the workholding member when the workpieces are no longer finished to the predetermined dimension as indicated by the gaging.

The Kempton and Gallimore Patent No. 1,731,719, granted October 15, 1929, discloses the use of a work-calipering or gage mechanism which is arranged to determine the dimension of each successive workpiece by entry within the finished bore thereof when the workpiece reaches finished dimension for bringing the cutting operation to a close. This type of machine, however, involves a plurality of reciprocations of the cutting tool over the surface of the workpiece and a lateral or crossfeed movement of the cutting tool relative to the workpiece to cut deeper and deeper into the surface of said workpiece until the predetermined dimension, as indicated by the gage, is reached.

This type of gage control is not applicable to machines of the type involved in the present invention in which the cutting tool is supported in fixed relation relative to the axis of the workpiece and the cutting operation involves a predetermined movement of said tool over the surface of the workpiece and subsequent withdrawal of the cutting tool from the workpiece. According to the present invention, the gaging or work-calipering means is operative after the cutting operation is completed to determine whether the workpiece is reduced to the desired dimension. When the workpiece is completed to the predetermined dimension, the work-calipering mechanism has no effect on the operation of the machine; when the work-calipering member, however, indicates that the workpiece is not reduced to the desired dimension, then a compensatory movement of the cutting tool relative to the axis of the workholding member is procured.

The above noted Kempton and Gallimore patent also discloses a mechanism by which to procure a compensatory movement of the cutting tool relative to the workholder at the end of each cutting operation in order to compensate for the reduction in size of the cutting tool, said movement being procured in response to the separation of the cutting tool from the workpiece. Such compensatory movement is satisfactory and operable only in machines in which the cutting surface of the tool is reduced to a substantial extent during each cutting operation so that the predetermined compensatory movement for each cutting operation does not carry the cutting tool beyond the proper position for cutting the succeeding workpiece to the predetermined dimension. The incorporation of a compensatory movement of this type in machines in which wear on the cutting surface becomes appreciable only after a multiplicity of cutting operations would necessarily result in an excessive compensatory movement which would carry the cutting surface of the tool beyond the proper position with the result that subsequent cutting operations would reduce the workpieces beyond the desired dimension. It is accordingly a further object of the invention to provide for a compensatory movement of the cutting tool relative to the workpiece only when the workpieces are no longer finished to the proper dimension. In accordance with this feature of the invention, the mechanism by which to procure the compensatory movement is controlled by the gage member independently of the number of workpieces on which a cutting operation is performed.

Other and further objects and advantages will appear with the following detailed description taken in connection with the accompanying drawings in which:—

Fig. 1 is a front elevation of a machine embodying the invention, certain of the parts thereof being broken away to show the construction.

Fig. 3 is an end elevation of the cutting tool spindle and the mechanism associated therewith as seen from the right of the machine.

Fig. 4 is a section along the line 4—4 of Fig. 1 showing the compensatory mechanism for the cutting tool spindle.

Like reference characters refer to like parts in the different figures.

Figure 6:
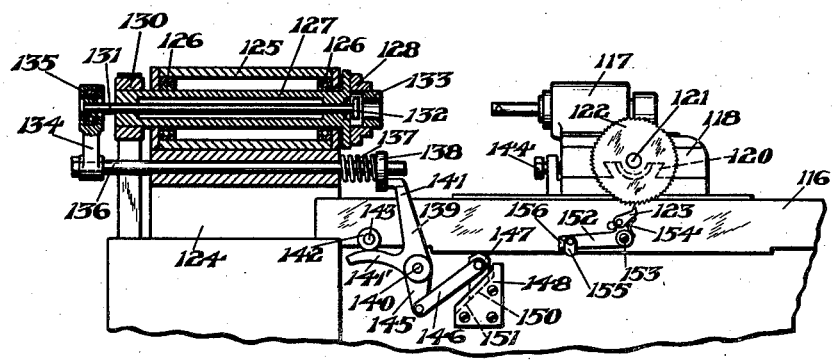
Fig. 6 is a fragmentary view similar to Fig. 1 showing a modification of the invention.

Referring to Fig. 1, the invention is shown in connection with a machine of the same general construction as that shown and fully described in the copending application of Schmidt Serial No. 552,625 above noted. In such a machine, the base 1 of the machine provides a horizontally movable table 2 supported on ways not shown, said table being actuated by fluid under pressure to procure a longitudinal traversing movement between a cutting tool 3 carried by the table and a rotating workpiece 4 carried by a workhead 5 mounted on a bridge 6 which spans the slideways provided by the machine base.

The cutting operation on each workpiece involves a single traversing movement of the tool over one surface of the rotating workpiece, said workpiece being reduced to size by the single cut, the tool operating upon the workpiece as the table 2 is moved to the left to advance the tool over the surface of the workpiece. The tool is subsequently moved to the right to withdraw the tool from the workpiece, in the manner disclosed in the above noted Schmidt application. It is sufficient to note for the purposes of the present application that a pair of reversing dogs 7 and 8 are carried by the slide for engagement with a reversing lever 10 which is connected to and rocks a reversing valve 11, see Fig. 5. At the end of the movement of the table to the left, after the cutting tool has passed through the workpiece, the reversing lever 10 is engaged by the right hand reversing dog 8 and is rocked counterclockwise, thereby rocking the reversing valve 11 and procuring movement of the table to the right to withdraw the cutting tool from the workpiece. As the carriage moves to the right, it is brought to rest by engagement of a stop dog 12, on the table, with a stud 13 rigidly mounted on the base of the machine; said engagement occurs just as the reversing lever 10 is engaged by the dog 7 and is brought into upright position at which time the reversing valve 11 is in mid-position and the flow of fluid through said valve is entirely cut off.

Figure 5:
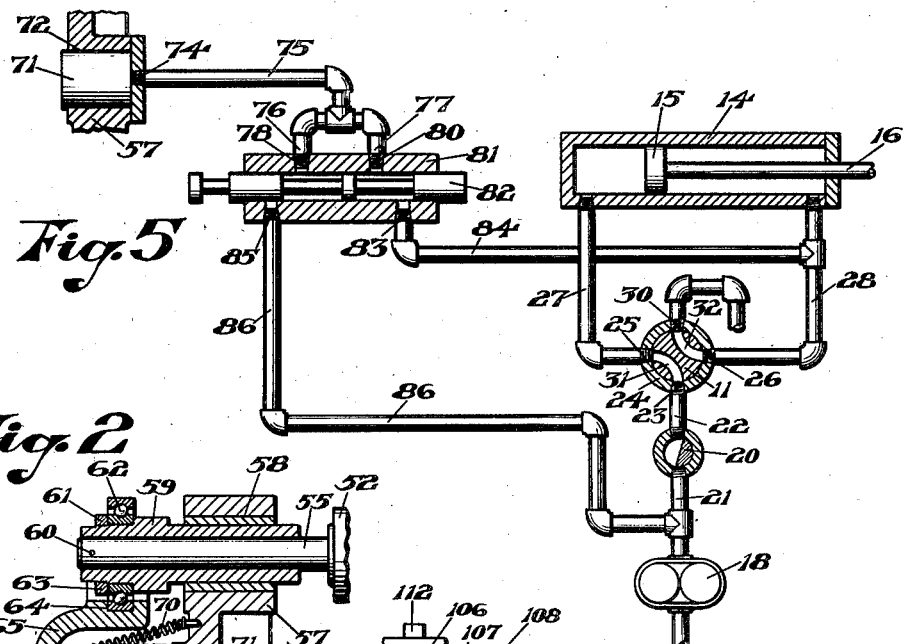
Fig. 5 is a fluid pressure diagram.

Referring now to Figs. 1 and 5, the fluid pressure mechanism by which the table is actuated comprises a cylinder 14 which is carried within the base 1 of the machine and which receives a piston 15 slidable therein; a piston rod 16 projects beyond the cylinder 14 and the end of the rod is secured to a lug 17 on the table 2. Fluid under pressure from the pump 18 is directed through a throttle valve 20, Fig. 5, to the reversing valve 11 by pipes 21 and 22; the pipe 21 connects the pump 18 to the throttle valve 20 and the pipe 22 connects the throttle valve 20 to the inlet port 23 of the reversing valve casing 24. Outlet ports 25 and 26 in the casing 24 are connected to the opposite ends of the cylinder 14 by pipes 27 and 28, and the casing 24 is also provided with an outlet port 30. In response to movements of the valve 11 by the reversing lever 10 in the manner above disclosed, channels 31 and 32 in the reversing valve 11 direct fluid under pressure alternately to opposite ends of the cylinder 14 to procure the above-mentioned longitudinal movements of the table.

The above mechanism is not of itself the subject matter of the present invention, the latter involves the attainment, in connection with such or similar mechanism, of the novel results above set forth. In accordance with the present invention, a gage member is urged toward the workpiece being operated upon as the cutting tool is withdrawn from the workpiece in order to determine the dimension of the workpiece. If the bore of the workpiece is sufficiently large to permit the gage to enter therein, thereby indicating that the workpiece is the predetermined dimension, no compensatory movement of the cutting tool takes place. However, if the bore of the workpiece is not sufficiently large to accommodate the gage, the cutting tool is moved transversely relative to the workholding member to compensate for the reduction in size of the cutting tool.

Referring first to Figs. 1, 3 and 4, which show the mounting for the cutting tool, the table 2 carries a bracket 33 securely mounted on the top thereof, said bracket having a longitudinal bore 34 therein which receives an eccentric sleeve 35. A member 36 has an annular portion 37 which surrounds the sleeve 35 and is secured to said sleeve by a key 38. A projecting portion 40 of the member 36 extends through a slot 41 in the bracket 33 and carries beyond the surface of said bracket a plurality of ratchet teeth 42 which are arranged for engagement with a pawl 43, movement of which procures a transverse compensatory movement of the cutting tool on the table as will hereinafter appear.

The annular portion 37 of the member 36 is rotatably received in an annular recess 44 in the bracket 33 and can therefore rotate the sleeve 35 to which said member 36 is keyed. The sleeve 35 has an eccentric bore 45 extending longitudinally thereof in which is mounted the right hand end of a spindle 46, the cutting tool 3 being carried by the left hand end of said spindle. An annular flange 47 on said spindle 46 substantially midway of the length thereof engages the left hand end of the bracket 33 and is provided with a notch 48 which receives the projecting end of a pin 50 mounted in the bracket 33. The pin 50 holds said spindle 46 against rotation relative to the bracket to maintain the cutting tool in proper angular relation to said bracket, but permits rotation of the sleeve 35 about said spindle, the latter being held against axial movement in said sleeve by a nut 51 which is screw threaded on the right hand end of said spindle and engages the end of the sleeve 35. Thus rotation of the sleeve 35 in the bracket 33 in response to movement of the pawl 43 causes a small lateral feeding movement of the cutting tool transversely of the table without an appreciable change in the elevation of said tool or in the angular relation of said tool to the bracket, said lateral feeding movement compensating for the wear on the cutting surface of said tool.

Figure 2:
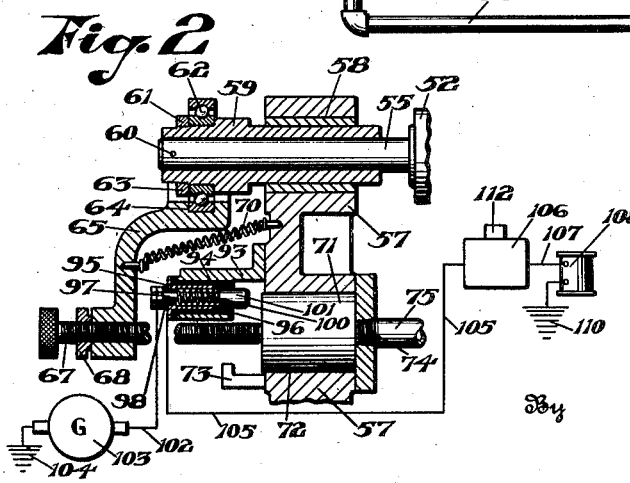
Fig. 2 is an enlarged vertical section of the end of the workhead of Fig. 1 with the electrical connections thereto shown diagrammatically.

Referring now to Figs. 1 and 2, the workhead 5 which is mounted on the bridge 6 supports a rotatably mounted hollow spindle 52, the left hand end of which carries a pulley 53 by which the spindle is rotated, and a workholding member 54 which is mounted on the right hand end of the spindle is arranged to clamp the workpiece 4 in axial alinement with said spindle. A gage rod 55 extends through the hollow spindle and carries on the right hand end thereof a gage member 56 which is arranged to be brought into operative relation to the workpiece 4, as each successive workpiece is finished, to control the mechanism which compensates for the wear on the cutting tool.

A bracket 57 which is carried by the bridge 6, as shown in Fig. 1, has a bore 58 therein in alinement with the gage rod. A sleeve 59 which is rotatably and axially slidable in the bore 58 receives the left hand end of the gage rod and is secured thereto by a pin 60. The inner race 61 for a series of ball bearings 62 is clamped on the left hand end of said sleeve 59 by a clamping nut 63 and the outer race for said bearings is received in a groove 64 in an arm 65, thereby supporting said arm against movement axially of the gage rod although allowing rotation of the sleeve and gage rod in said arm. The arm 65 depends from said gauge rod and carries a threaded rod 67 horizontally therein, said rod being longitudinally adjustable in said arm and being locked in adjusted position by a clamping nut 68. A spring 70, the ends of which are secured respectively to the arm 65 and to the bracket 57 urges the arm 65 and the gage rod therewith toward the right to carry the gage member 56 into the bore of the workpiece 4.

During the cutting operation, as the cutting tool is carried to the left into the workpiece, the gage member 56 is withdrawn from contact with said workpiece to avoid contact between said gage and the cutting tool. To accomplish this, the right hand end of the rod 67 is in alignment with, and engages, a piston 71 slidable in a cylindrical bore 72 provided by the bracket 57 and said piston 71, during the left hand movement of the table, is urged to the left by fluid under pressure, thereby withdrawing the gage from the workpiece. Movement of the piston 71 toward the left is limited by a stop 73 secured to the bracket 57, said stop engaging the outer end of said piston at the left hand end of the piston movement.

Referring to Fig. 5, a port 74 in the cylindrical bore 72 is connected by a pipe 75 and branch pipes 76 and 77 to spaced ports 78 and 80 in a valve casing 81 which is mounted on the front of the base 1 of the machine, as shown in Fig. 1. A cylindrical valve 82 in the casing 81 provides fluid connection, in one position, between the port 80 and an inlet port 83 in the casing 81 which port is connected by a pipe 84 to the pipe 28, the latter providing connection between the reversing valve 11 and the right hand end of the cylinder 14.

In the other position of the valve 82, fluid connection is provided between the port 78 and a second inlet port 85 which is spaced from the port 83 and which is connected by a pipe 86 to the pressure side of pump 18. As shown in Fig. 1, the valve 82 is actuated in response to movements of the table 2 through a lever 90, the upper end of said lever being in alinement with a depending dog 92 carried by the table.

As above stated, the movements of the valve 82 in response to the table movements, control the position of the gage member relative to the workpiece. Referring to Fig. 5, which represents the elements in a position corresponding to the position of the parts in Fig. 1, with the table at the time moving to the right and with the cutting tool withdrawn from the bore of the workpiece, fluid under pressure is entering the left hand end of the cylinder 14 as directed thereto by the reversing valve 11. At the same time, fluid from the cylindrical bore 72 is exhausting through ports 80 and 83 into the pipe 28 and thence through the exhaust port 30, thereby permitting the gage 56 to be urged to the right under the influence of the spring 70 into the bore of the workpiece. As the carriage continues its movement to the right, the dog 92 engages and rocks the lever 90, moving the valve 82 to the left to admit fluid from the pump 18 through the pipe 86 and port 78 to the cylindrical bore 72. The piston 71 is thus urged to the left and withdraws the gage from the bore of the workpiece before the table reaches the rest position shown in dotted lines in Fig. 1 in order to permit removal of the completed workpiece and the insertion of an unfinished workpiece within the workholding member.

During the cutting operation on a subsequent workpiece, as the table is urged from the rest position shown toward the left in response to fluid under pressure which is admitted to the right hand end of the cylinder 14, the gage is maintained out of work-engaging position by fluid under pressure which passes through the pipe 86 to the cylindrical bore 72, the valve 82 being still in the left hand position. During this movement of the table to the left toward the workpiece, the dog 92 engages the lever 90 and the valve 82 is returned to the position shown. Since fluid under pressure at this time is entering the right hand end of the cylinder through the pipe 28, fluid under pressure passes from the pipe 28 through the pipe 84 to the cylindrical bore 72 and the gage is thus maintained at the left hand end of movement regardless of the position of the valve 82. However, when the table is reversed at the left hand end of a stroke, fluid under pressure exhausts from the right hand end of the cylinder 14 and accordingly is allowed to exhaust from the cylindrical bore 72 and the gage member 56 is moved by the spring 70 into the bore of the workpiece.

As above pointed out, so long as each successive workpiece is sufficiently large to permit entry of the gage therein, no compensatory movement of the cutting tool occurs. However, when a workpiece in the workholding member, after the cutting operation has been performed thereon, is too small in diameter to permit the gage to enter therein, the compensatory mechanism is set in operation by the failure of the gage to enter the bore of the workpiece and the cutting tool is moved laterally of the table. Referring to Fig. 2, a support 93 is mounted on the bracket 57 and provides a cylindrical bore 94 in which is mounted a sleeve 95, the latter being separated from the cylindrical bore 94 by insulating material 96, and extending only a portion of the length of the cylindrical bore. A plunger 97 is slidable within the sleeve 95 and is spaced therefrom by an annulus 98 of insulating material which is secured in the left hand end of the sleeve 95. The plunger 97 is urged to the right by a spring 100, the left hand end of which engages the annulus 98 and the right hand end of which engages the enlarged right hand end 101 of the plunger 97, said end 101 normally engaging the insulation 96 beyond the sleeve 95 when the piston 71 is in right hand position.

The engagement of the sleeve 95 with the enlarged end 101 of the plunger closes a portion of the circuit through an electromagnet by which the pawl 43 is actuated and the engagement of the sleeve and the enlarged end 101 occurs when a workpiece is not reduced to the proper finished size. Referring to Fig. 2, the enlarged end 101 of the plunger is in alinement with the piston 71 and movement of the piston to the left to withdraw the gage from the workpiece engages the enlarged end 101 of the plunger and urges said plunger to the left bringing the enlarged end 101 into engagement with the sleeve. As the piston 71 is returned to the right, under the influence of the spring 70 during the movement of the table to the right, the gage 56 enters the bore of the workpiece so that the spring 70 acts to carry the piston 71 into the extreme right hand position and the enlarged end 101 of the plunger is carried to the right by the spring 100 out of engagement with the sleeve. However, when the workpiece in the workholder is not finished to the proper size, the gage cannot enter the bore thereof during the right hand movement and thus the gage rod and associated parts are moved only a short portion of the distance toward the right. Since the spring 100 is not, of itself, heavy enough to move the piston 71, said piston is moved to the right only the short movement imparted by the spring 70, and the enlarged end 101 of the plunger is thus maintained within the sleeve 95 and in contact therewith when the gage fails to enter the workpiece at the end of the cutting operation.

The circuit by which the pawl 43 is actuated is shown in Fig. 2. The plunger 97 is connected by a lead 102 to a generator 103 which is grounded at 104, and the sleeve 95 is connected by a lead 105 to one terminal of a switch, not shown, in a switch box 106 on the front of the base 1, the other terminal of said switch being connected by a lead 107 to one terminal of an electromagnet 108, the other terminal of which is grounded at 110. The electromagnet 108, which is diagrammatically shown in Fig. 2, is mounted on the bracket 33 which supports the cutting tool and carries an armature member 111, the outer end of which pivotally supports the pawl 43, the latter depending in engagement with the ratchet teeth 42. When the gage fails to enter the bore of the finished workpiece, thereby indicating that the cutting tool is worn down so that the workpieces are no longer finished to the proper size, the enlarged end 101 of the plunger remains in engagement with the sleeve 95, as above pointed out, thereby energizing the electro-magnet causing attraction of the armature 111 to carry the pawl 43 to the left, Fig. 3, thereby rotating the eccentric sleeve 25 through a small angle to procure a small transverse movement of the cutting tool in the manner above pointed out.

The circuit to the electromagnet so far disclosed would cause energization of the electromagnet 108 during each cutting operation since, as the gage is withdrawn from the workpiece by movement of the piston 71 to the left, the enlarged end 101 of the plunger engages the sleeve 95 and closes the circuit by which the electromagnet is actuated. To avoid this energization of the electromagnet, which would procure undesired transverse movement of the cutting tool, the switch member within the box 106 is normally in open position so that the circuit through the electromagnet remains open even with the plunger 101 in engagement with the sleeve 95. The switch within the box 106 is momentarily closed during the right hand movement of the table, during the portion of the table movement when the gage is moved into operative position relative to the workpiece. As shown in Fig. 1, closure of the switch in the box 106 is procured by depression of a push button 112 which is in alinement with a dog 113 pivotally mounted on a pin 114 carried by the table, said dog normally depending in the position shown. The dog 113 is free to rock counterclockwise as the table moves to the left and passes over the button 112 without depressing said button. Clockwise movement of the dog 113 is prevented by engagement of said dog 113 with a shoulder 115 on the table so that during movement of the table to the right, the dog 113 engages and depresses the push button 112 closing the circuit from the sleeve member 95 through the electromagnet 108.

As above stated, the switch within the box 106 is closed during the portion of the right hand movement of the table when the gage is in its right hand position in operative relation to the workpiece. Thus, if the workpiece is finished to the proper size, the gage enters the workpiece on its right hand movement as the table moves toward the right and the enlarged end 101 of the plunger 97 is carried by the spring 100 out of engagement with the sleeve 95 so that the circuit from the generator to the switch in the box 106 is broken, and closing of said switch, as the table moves to the right, accordingly has no effect on the electromagnet 108 and no compensatory movement of the cutting tool occurs. If the gage fails to enter the workpiece by reason of the small diameter of said workpiece, the enlarged end 101 of the plunger 97 remains within the sleeve 95, as above pointed out, thereby closing the circuit from the generator to the switch in the box 106 so that as the table moves to the right and said switch is closed, the circuit through the electromagnet 108 is completed, thereby energizing said electromagnet to procure a compensatory movement of the cutting tool.

The operation of the machine which will be apparent from the above description will be briefly summarized. With the parts in the position shown in Fig. 1, the table is moving toward the right as indicated by the arrow, the cutting tool having been withdrawn from the workpiece. The gage member 56 is within the bore of the workpiece 4 since, as the table begins its right hand movement, the pressure fluid was exhausted from the horizontal bore 72 in response to the pull of the spring 70, allowing the piston 71 and thus the gage member 56 to move to the right into the position shown. As the movement of the table to the right continues from the position shown, the dog 113 engages and depresses the push button 112 to close the switch in the box 106. When closing of said switch occurs, the gage member 56 is still within the bore of the workpiece and the enlarged end 101 of the plunger is out of engagement with the sleeve 95, these members being separated by the entry of the gage within the workpiece, as above pointed out, so that the circuit from the generator to the switch is broken, and closing of said switch has no effect on the electromagnet 108 and no compensatory movement of the cutting tool occurs. Upon continued movement of the table to the right, the depending dog 92 rocks the lever 90 moving the valve 82 to the left to admit fluid under pressure to the cylindrical bore 72 to urge the gage member 56 from the bore of the workpiece and the table is thereafter brought to rest in the manner above pointed out by engagement of the dog 12 with the stud 13 on the base of the machine.

The finished workpiece having been replaced by an unfinished workpiece, the gage having been withdrawn to the left, as above pointed out, to permit such replacement, movement of the table to the left to carry the cutting tool into engagement with the workpiece is procured by manual rocking of the reversing lever 10. During this movement to the left, the dog 92 engages the lever 90 and rocks the valve 82 to the right into the position shown. During the entire movement of the table to the left, fluid under pressure is admitted through the valve 82 to the cylindrical bore 72 in either position of said valve and the gage is maintained in its left hand position. Continued movement of the table to the left, after rocking of the lever 92, brings the dog 113 into engagement with the button of the switch, said dog 113 swinging over said button 112 without depressing it. When the cutting tool has passed through the bore of the workpiece during the left hand movement of the table, the reversing dog 8 engages and actuates the reversing lever 10, thereby initiating the withdrawal or right hand movement of the table. As soon as the right hand movement of the table is initiated, the pressure fluid is allowed to exhaust from the cylindrical bore 72 through the pipe 86 and the gage is moved toward the workpiece by the spring 70. If the gage member 56 enters the workpiece, movement of the table to the right continues without the compensatory movement of the cutting tool in the manner above pointed out.

However, when the gage member 56 fails to enter the bore of the workpiece but engages the left hand end thereof indicating that the finished workpiece is not the proper size, the piston 71 is carried only a short portion of its normal movement to the right and the enlarged end 101 of the plunger 97 is retained within the sleeve 95, thereby closing the circuit from the generator to the switch in the box 106. As the table continues its right hand movement, the dog 113 closes the switch in the box 106, thereby energizing the electromagnet 108, causing attraction of the armature member 111 to rock the pawl 43. Movement of pawl 43 turns the eccentric sleeve 35 through a small angle and thereby moves the cutting tool laterally of the table. Following this compensatory movement, the cutting operation on successive workpieces takes place without further compensatory movement with the gage entering the bore of each workpiece during the withdrawal of the cutting tool from said workpiece. When the cutting tool again becomes worn and the workpiece is finished to a size which fails to permit the gage to enter therein, another compensatory movement takes place in the manner above described.

Referring now to the modification of Fig. 6, the invention is disclosed in a mechanism which is operated mechanically and in which the movements of the gage member are controlled directly from the movements of the table. In this modification, the table 116 carries a tool head 117 on a cross slide 118 which is movable on ways 120 on said table, and transverse movement of the tool head is procured in response to rotation of a crossfeed screw 121, the forward end of which carries a ratchet wheel 122 which is engaged by a pawl 123, said pawl being actuated as soon as the size of a finished workpiece is such that the gage is prevented from entering the finished bore therein.

A bridge 124 which spans the slideways, not shown, for the table 116 at the right hand end thereof, supports a workhead 125 thereon, and said workhead provides spaced bearings 126 for the reception of a hollow work spindle 127, the latter carrying on the right hand end thereof a workholding member 128 and on the left hand end thereof a pulley 130 by which said spindle is rotated. A gage rod 131 is slidable longitudinally through said spindle and the right hand end thereof carries a gage member 132 for entry within the bore of a workpiece 133 mounted in the workholding member 128. A bracket 134 is secured against axial movement on the left hand end of the gage rod 131 by means of the ball bearing member 135 and the depending end of the bracket 134 is secured to a rod 136 supported by and slidable longitudinally through the bridge 124 in parallel relation to the gage rod 131. The opposite ends of a spring 137 which surrounds the rod 136 engage respectively the bridge 124 and a collar 138 adjacent the right hand end of rod 136, said spring normally urging the rod 136 and accordingly the gage rod 131 toward the right to carry the gage member 132 into engagement with the workpiece.

A bell crank lever 139 pivotally mounted on a stud 140 on the front of the machine has the end of one arm 141 in engagement with the collar 138, and the other arm 141' thereof, which is arcuate, is in alinement with a roller 142 mounted on a stud 143 on the table, said roller engaging said arm as the table is brought to rest position at the right hand end of movement to depress said arm, thereby withdrawing the gage rod to the left carrying the gage out of engagement with the bore of the workpiece and permitting removal of the finished workpiece from the workholding member and the insertion of an unfinished workpiece therein.

As the table moves toward the left, as by the fluid control means above disclosed, a bolt 144 carried in a bracket on the table engages the right hand end of the rod 136 to carry said rod to the left and accordingly to withdraw the gage member away from the workpiece to permit entry of the cutting tool therein. As the table is reversed and returns to the right, the bolt 144 is carried out of engagement with the rod 136 and the spring 137 carries the gage to the right into the bore of the workpiece. As the table moves further to the right to rest position, the roller 142 engages the arm 141' of the bell crank lever 139 and withdraws the gage from the workpiece as above stated.

If a finished workpiece is too small to permit entry of the gage therein, the cutting tool is moved laterally of the table to compensate for the wear thereon and to position said tool so that the subquent cutting operation will produce a finished workpiece of the proper size. To this end, the bell crank lever 139 has an arm 145 depending therefrom, said arm being connected by a link 146 to a lug 147 which is slidable on a block 148 carried on the base of the machine, said lug and block having cooperating angular surfaces 150 and 151 so that movement of said lug in response to rocking movement of the bell crank lever results in a raising or lowering of said lug relative to the table. The table 116 carries a bell crank lever 152 which is pivotally mounted on a stud 153 on said table. One end of the bell crank lever 152 carries the pawl 123 which is held in engagement with the ratchet wheel 122 by a spring 154; the other end of the bell crank lever carries a pivotally mounted dog 155 which is held against clockwise rotation from the normal depending position shown by a projection 156 on the bell crank lever, and which depends in alinement with the upper end of the lug 147, when the latter is in raised position.

As the table moves to the left, the dog 155 swings on its pivot and passes over the lug 147 without movement of the lever 152. As the table returns to the right, however, the gage member 132 is allowed to move to the right, as above pointed out, and enters the workpiece, thereby moving the lug 147 to the left and downwardly out of alinement with the dog 155 so that no movement of the bell crank lever 152 occurs during the right hand movement of the table. Upon failure of the gage member 132 to enter the workpiece during the right hand movement of the table, by reason of the small diameter of said workpiece, the bell crank lever is not rocked clockwise enough to withdraw the lug 147 out of operative position, so that said lug 147 is retained in its raised or right hand position in alinement with the dog 155 and said dog engages and is actuated by the lug, thereby actuating the ratchet wheel 122 to procure a transverse feeding movement of the cutting tool.

The operation of this modification which will be apparent from the preceding discussion will be briefly summarized. An unfinished workpiece having been placed within the workholding member, the table is started from the rest position shown, and moves to the left to carry the cutting tool into engagement with the rotating workpiece. At the beginning of this left hand movement, the gage which has been held out of engagement with the workpiece by the roller 142 is released and allowed to engage the workpiece. Further movement to the left carries the bolt 144 into engagement with the right hand end of the rod 136, thereby carrying the gage away from the workpiece as the cutting tool enters therein. During this left hand movement, the dog 155 has passed over the lug 147 without being actuated thereby. After the cutting tool has passed through the bore of the workpiece during the left hand movement, the table is reversed, as by the mechanism shown in Fig. 1, and the table moves to the right carrying the bolt 144 out of engagement with the end of the rod 136 and permitting the gage to enter the bore of the workpiece. Entry of the gage carries the lug 147 to the left and downwardly so that as the table continues to move to the right, the dog 155 is carried to the right therewith but does not engage the lug by reason of its lowered position. Just prior to the right hand end of the movement of the table before it is brought to rest by suitable automatic mechanism, the roller 142 engages the bell crank lever 139 and withdraws the gage out of the bore of the workpiece.

This same operation continues for each successive workpiece until the cutting tool is worn to such an extent that the bore of the finished workpiece does not permit the gage to enter therein. When this occurs, during the right hand movement of the table, the gage abuts the end of the workpiece and is prevented from entering within said workpiece. Thus, the bell crank lever 139 is not rotated counterclockwise to the normal extent and therefore the lug 147 is maintained in its right hand position in alinement with the dog 155 so that said dog is swung upwardly by said lug to actuate the pawl 123, and the cutting tool is thus moved laterally of the table to compensate for the wear thereon. After this compensatory movement, the original operation on each workpiece continues on successive workpieces until the wear on the cutting tool is such that the finished bore of the workpiece fails to permit the gage to enter therein.

From the foregoing, it will be apparent that the invention is applied to a machine which is arranged for the successive reduction of a plurality of workpieces to a predetermined dimension, in which machine the cutting operation involves a predetermined movement of the cutting tool over the surface of the workpiece and subsequent withdrawal of the cutting tool from the workpiece, the cutting tool during the cutting operation being maintained in predetermined relation to the axis of the workpiece. At the completion of the cutting operation, a work-calipering means determines the dimension of the workpiece, that is, when the gage member enters the bore of the workpiece it indicates that the bore of the workpiece is enlarged by the cutting operation to the desired dimension, and upon failure of the gage member to enter the workpiece, it indicates that the finished workpiece is under dimension as a result of the wear on the cutting tool. Thus, the work-calipering or gage means has a normal movement, which involves the entry of said gaging means into the finished bore of the workpiece, said normal movement being interrupted when the finished dimension of the workpiece does not permit entry of the gage therein. Interruption of the normal movement of the gage means, or failure of the gage means to enter the workpiece, operates to procure a compensatory movement of the cutting tool relative to the workholder so that subsequent workpieces will be reduced to the desired dimension. The compensatory movement of the cutting tool is procured during and in response to the withdrawal movement of the table which carries the cutting tool out of the workpiece although such compensatory movement occurs only when the workpiece is not reduced to the proper finished dimension so that said movement occurs independently of the number of cutting operations between successive compensatory movements.

I claim:

1. In a machine for the machining of one surface of each of a plurality of workpieces successively to a predetermined dimension, a fixed cutting tool and a workholder providing for rotation of a workpiece positioned therein, means to procure a cutting operation on each successive workpiece, said operation involving a single longitudinal movement of the tool over the surface of the workpiece and subsequent withdrawal of the cutting tool from said workpiece, work-calipering means operative upon the withdrawal of the tool from the workpiece, and means under the control of said work-calipering means and responsive to the relative withdrawal movement of said tool from said workpiece and operative only when the workpiece is not reduced to the desired dimension as indicated by the calipering means for procuring a compensatory movement of the cutting tool relative to the workholder when the workpiece is not reduced to the predetermined dimension.

2. In a machine for the successive machining of a plurality of workpieces to a predetermined internal diameter, a fixed cutting tool and a workholder providing for rotation of a workpiece positioned therein, means for procuring a cutting operation on each successive workpiece, said cutting operation involving a single relative longitudinal reciprocatory movement of said tool over the inner surface of the workpiece and relative withdrawal of the cutting tool from the workpiece at the completion of the cutting operation, means responsive to the withdrawal movement for determining the internal diameter of the workpiece by entry of a gage member within the bore thereof, and means operative only upon failure of said gage means to enter said workpiece for procuring a compensatory movement of the cutting tool relative to the workholder.

3. In a machine for the successive machining of a plurality of workpieces to a predetermined internal diameter, a fixed cutting tool and a workholder providing for rotation of a workpiece positioned therein, means for procuring a cutting operation on each successive workpiece, said cutting operation involving a single longitudinal reciprocatory movement over the inner surface of the workpiece and withdrawal of the cutting tool from the workpiece at the completion of the cutting operation, means responsive to the withdrawal movement for determining the internal diameter of the workpiece by entry of a gage member within the bore thereof, means operative only upon failure of said gage means to enter said workpiece for procuring a compensatory movement of the cutting tool relative to the workholder, and means responsive to further withdrawal movement of the cutting tool from the workpiece for withdrawing the gage member out of the bore of the workpiece.

4. In a machine for the successive machining of a plurality of workpieces to a predetermined internal diameter, a fixed cutting member and a workholding member providing for rotation of a workpiece positioned therein, a reciprocatory table on which one of said members is mounted, means to procure a single reciprocatory movement of said table for carrying the cutting tool into engagement with the inner surface of the workpiece, and for subsequently withdrawing said tool from said workpiece, a gage member, means responsive to movement of the table during the wthdrawal movement of the cutting tool from the workpiece for moving said gage member toward the workpiece, said gage member being arranged to enter the bore of said workpiece when the latter is finished to the predetermined internal diameter, and means operative only upon failure of the gage member to enter the bore of the workpiece for procuring a lateral movement of the cutting tool relative to the workholder.

5. In a machine for the successive machining of a plurality of workpieces to a predetermined internal diameter, a fixed cutting member and a workholding member providing for rotation of a workpiece positioned therein, a reciprocatory table on which one of said members is mounted, means to procure a single reciprocatory movement of said table for carrying the cutting tool into engagement with the inner surface of the workpiece, and subsequently withdrawing said tool from said workpiece, a gage member, means responsive to movement of the table during the withdrawal movement of the cutting tool from the workpiece to move said gage member toward the workpiece, said gage member being arranged to enter the bore of said workpiece when the latter is finished to the predetermined internal diameter, means operative upon failure of the gage member to enter the bore of the workpiece for procuring a lateral movement of the cutting tool relative to the workholder, and means responsive to further withdrawal movement of the table for withdrawing the gage member out of contact with the workpiece.

6. In a machine for the successive machining of a plurality of workpieces to a predetermined internal diameter, a fixed cutting member and a workholding member providing for rotation of a workpiece positioned therein, a reciprocatory table on which one of said members is mounted, means to actuate said table to procure a cutting operation between the cutting tool and a workpiece in the workholder, said cutting operation involving movement of the table in one direction to carry the cutting member over the inner surface of the workpiece and subsequent movement of the table in the opposite direction to withdraw the cutting member from engagement with the workpiece, a gage member normally out of engagement with the workpiece, means for moving said gage toward the workpiece in response to the withdrawal movement of the cutting tool from the workpiece, said gage being prevented from entering the workpiece when said workpiece is not finished to the predetermined internal diameter, and means controlled by the failure of said gage to enter the bore of the workpiece and operative during the withdrawal movement of the cutting tool from the workpiece for procuring a transverse feeding movement of the cutting tool relative to the workpiece.

7. In a boring machine for the successive machining of a plurality of workpieces to a predetermined internal diameter, a workholding member providing for rotation of a workpiece positioned therein, a boring tool mounted in fixed relation to the axis of the workholder during each successive cutting operation, work-calipering means operative after the completion of each cutting operation, and means under the control of said work-calipering means for procuring a lateral movement of the boring tool relative to the axis of the workholder when a workpiece in said workholder is not finished to the desired internal diameter as indicated by said work-calipering means.

8. In a boring machine for the successive machining of a plurality of workpieces to a predetermined internal diameter, a rotatable workholder, a boring tool mounted in fixed relation to the axis of the workholder during each cutting operation, gage means operable after the completion of the cutting operation on each successive workpiece for entering the bore thereof, means to procure a lateral movement of the boring tool relative to the axis of the workholder when the finished internal diameter of the workpiece prevents entry of the gaging means therein, and automatic means operable after the testing of the internal diameter of the workpiece by said gage for withdrawing the latter from the bore of the workpiece.

9. In a boring machine for the successive machining of a plurality of workpieces to a predetermined internal diameter, a rotatable workholder, a boring tool mounted in fixed relation to the axis of the workholder during each cutting operation, gaging means operable after the completion of the cutting operation, and after the boring tool is withdrawn from the workpiece, for entry within the bore of said workpiece, and means responsive to failure of said gaging means to enter the bore of the workpiece and operable during the withdrawal movement of the boring tool from the workpiece for procuring a lateral movement of the boring tool relative to the axis of the workholder.

10. In a boring machine for the successive machining of a plurality of workpieces to a predetermined internal diameter, a rotatable workholder, a boring tool mounted in fixed relation to the axis of the workholder during each cutting operation, gaging means operable after the completion of the cutting operation, and after the boring tool is withdrawn from the workpiece, for entry within the bore of said workpiece, means responsive to failure of said gaging means to enter the bore thereof for procuring a lateral movement of the boring tool relative to the axis of the workholder, and means operable after the operation of said gage means and responsive to the withdrawal movement of the tool from the workpiece for withdrawal of the gage from the bore of said workpiece.

11. In a boring machine for the successive machining of a plurality of workpieces to a predetermined internal diameter, a rotatable workholding member, a boring tool mounted in fixed relation to the axis of the workholding member during the cutting operation on each successive workpiece, means for gaging the finished internal diameter of each successive workpiece after the cutting operation thereon is completed, and means under the control of the gaging means to procure a lateral movement of the boring tool relative to the axis of the workholding member when the finished workpiece is not the desired internal diameter as indicated by said gaging means.

12. In a boring machine for the successive machining of a plurality of workpieces to a predetermined internal diameter, a rotatable workholding member, a boring tool mounted in fixed relation to the axis of the workholding member during the cutting operation on each successive workpiece, means for gaging the finished internal diameter of each successive workpiece, and means to procure a lateral movement of the boring tool relative to the axis of the workholding member when the finished workpiece is not the desired internal diameter as indicated by said gaging means, said gaging means being normally out of contact with the workpiece and being operative during the withdrawal of the boring tool from the workpiece at the end of the cutting operation.

13. In a machine for the successive machining of a plurality of workpieces to a predetermined internal diameter, a workholding member, a cutting member mounted in predetermined relation to the axis of said workholding member, a reciprocatory table on which one of said members is mounted, means to procure a cutting operation on each successive workpiece, said operation involving a predetermined movement of said cutting member over the inner surface of a workpiece in the workholding member and subsequent withdrawal of said cutting member from the workpiece, a gage member, means to maintain said gage member out of contact with the workpiece during the cutting operation, means responsive to the withdrawal of the cutting tool from the workpiece for urging said gage member toward the workpiece, said gage member being arranged to enter the bore of said workpiece when the latter is finished to a predetermined internal diameter, means operable upon failure of the gage member to enter the bore of the workpiece for closing a portion of a circuit through an electromagnet by which to procure a lateral movement of the cutting member relative to the axis of the workholding member, and means responsive to the withdrawal movement of said cutting member from the workpiece for completing said circuit to energize said electromagnet, thereby to procure the lateral movement of the cutting member.

14. In a machine for the successive machining of a plurality of workpieces to a predetermined internal diameter, a workholding member, a cutting member mounted in predetermined relation to the axis of said workholding member, a reciprocatory table on which one of said members is mounted, means to procure a cutting operation on each successive workpiece, said operation involving a predetermined movement of said cutting member over the inner surface of a workpiece in the workholding member and subsequent withdrawal of said cutting member from the workpiece, a gage member, means to maintain said gage member out of contact with the workpiece during the cutting operation, means responsive to the withdrawal of the cutting tool from the workpiece for urging said gage member toward the workpiece, said gage member being arranged to enter the bore of said workpiece when the latter is finished to a predetermined internal diameter, means operable upon failure of the gage member to enter the bore of the workpiece for closing a portion of a circuit through an electromagnet by which to procure a lateral movement of the cutting member relative to the axis of the workholding member, means responsive to the withdrawal movement of said cutting member from the workpiece for completing said circuit to energize said electromagnet, thereby to procure the lateral movement of the cutting member, and means responsive to further withdrawal of the cutting member from the workpiece to withdraw the gage member from the workpiece.

15. In a boring machine for the successive machining of a plurality of workpieces to a predetermined internal diameter, a workholder providing for rotation of a workpiece positioned therein, a cutting tool mounted in fixed relation to the axis of the workholder during the cutting operation on each successive workpiece, work-calipering means operative at the end of each cutting operation in response to separation of the boring tool from the workpiece after the completion of the cutting operation, and means under the control of the work-calipering means and in response to the separation of the boring tool from the workpiece for procuring a lateral movement of the boring tool relative to the axis of the workholder when the finished workpiece in said workholder is not reduced to the desired internal diameter as indicated by said work-calipering means.

16. In a boring machine for the successive machining of a plurality of workpieces to a predetermined internal diameter, a workholder providing for rotation of a workpiece positioned therein, a boring tool mounted in fixed relation to the axis of the workholder during the cutting operation on each successive workpiece, work-calipering means operative at the end of each cutting operation in response to separation of the boring tool from the workpiece at the completion of the cutting operation, means under the control of the work-calipering means and in response to the separation of the boring tool from the workpiece for procuring a lateral movement of the boring tool relative to the axis of the work-holder when the finished workpiece in said workholder is not reduced to the desired internal diameter as indicated by said work-calipering means, and means responsive to further separation of the boring tool from the workpiece for separating said work-calipering means from the workpiece.

17. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for determining the internal diameter thereof, and means under the control of said work-calipering means for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter.

18. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for determining the internal diameter thereof, and means under the control of said work-calipering means and responsive to the withdrawal movement of the tool from the workpiece for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter.

19. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for determining the internal diameter thereof, means under the control of said work-calipering means and responsive to the withdrawal movement of the tool from the workpiece for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter, and other means responsive to the withdrawal movement and operable after the work-calipering means have tested the internal diameter of the workpiece for procuring a movement of said work-calipering means to inoperative position.

20. In a machine for the machining of one surface of each of a plurality of workpieces successively to a predetermined dimension, a workholding member providing for rotation of a workpiece positioned therein, a cutting member mounted in predetermined relation to the axis of said workholding member, means to procure a cutting operation on each successive work-piece, said operation involving a predetermined relative movement of said cutting member over the surface of a workpiece in the workholding member and subsequent relative withdrawal of said cutting member from the workpiece, work-calipering means operative in response to the withdrawal of the cutting member from the workpiece, means under the control of the work-calipering means and operable only when the workpiece is not reduced to the desired dimension for closing a portion of a circuit through an electromagnet by which to procure a lateral movement of the cutting member relative to the axis of the workholding member, and means responsive to the withdrawal movement of said cutting member for completing said circuit, thereby procuring the lateral movement of the cutting member.

21. In a machine for the machining of one surface of each of a plurality of workpieces successively all to the same predetermined dimension, a workholder providing for rotation of a workpiece positioned therein, a non-rotary cutting tool mounted in fixed relation to the axis of the workholder during the cutting operation on each successive workpiece, said operation involving a predetermined relative movement between the tool and workholder and subsequent withdrawal of the tool relative to the workholder, work-calipering means for determining the dimension of the workpiece and operative in response to said withdrawal movement after the completion of the cutting operation, means under the control of the work-calipering means and operative only when the workpiece is not reduced to the proper dimension for procuring a lateral adjustment of the cutting tool relative to the axis of the workholder, said work-calipering means, when the workpiece is reduced to the desired dimension, having no affect on the position of the cutting tool relative to the workholder.

22. In a machine for the machining of one surface of each of a plurality of workpieces successively all to a predetermined dimension, a cutting tool and a workholder, means for procuring a cutting operation on each successive workpiece, said operation involving a predetermined movement of the tool over the surface of the workpiece and subsequent withdrawal of the cutting tool from said workpiece, said tool and workholder having no relative lateral movement during the cutting operation, work calipering means operative upon the withdrawal of the tool from a workpiece, and means under the control of said work calipering means and operative only when the workpiece is not reduced to the desired dimension, as indicated by the calipering means for procuring a relative lateral movement between the cutting tool and the workholder to compensate for wear on the tool.

23. In a machine for the machining of one surface of each of a plurality of workpieces successively all to a predetermined internal diameter, a cutting tool and a workholder, means for procuring a cutting operation on each successive workpiece positioned in said workholder, said cutting operation involving a predetermined movement of the tool over the inner surface of the workpiece in the workholder and subsequent relative withdrawal movement of the cutting tool from the workpiece at the completion of the cutting operation, a gage, means responsive to the withdrawal movement for determining the internal diameter of the workpiece by entry of said gage within the bore thereof, and means operative only upon failure of said gage to enter said workpiece for procuring a lateral movement of the cutting tool relative to the workholder to compensate for wear on the tool.

HAROLD L. BLOOD.